United States Patent
Yoshihisa

(10) Patent No.: US 7,304,449 B2
(45) Date of Patent: Dec. 4, 2007

(54) STEPPING MOTOR CONTROL APPARATUS, STEPPING MOTOR CONTROL METHOD, AND STEPPING MOTOR CONTROL PROGRAM PRODUCT

(75) Inventor: Yasuhiko Yoshihisa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/368,453

(22) Filed: Mar. 7, 2006

(65) Prior Publication Data

US 2006/0202656 A1    Sep. 14, 2006

(30) Foreign Application Priority Data

Mar. 7, 2005   (JP) ............................. P2005-062025

(51) Int. Cl.
*G05B 19/40* (2006.01)
(52) U.S. Cl. ........................ 318/685; 318/696
(58) Field of Classification Search ................ 318/685, 318/696
See application file for complete search history.

(56) References Cited

U.S. PATENT DOCUMENTS

| | | | | |
|---|---|---|---|---|
| 4,104,574 A | * | 8/1978 | Schaff | 318/696 |
| 4,496,891 A | * | 1/1985 | Kobayashi | 318/696 |
| 5,262,709 A | * | 11/1993 | Yasuda | 318/696 |

FOREIGN PATENT DOCUMENTS

JP    2002-281788 A    9/2002

* cited by examiner

*Primary Examiner*—Rina Duda
(74) *Attorney, Agent, or Firm*—Sughrue Mion, PLLC

(57) ABSTRACT

A stepping motor control apparatus includes a control circuit to control the excitation sequence of a stepping motor, and a switching circuit to switch electric power to be supplied to the stepping motor based on an instruction from the control circuit, and when the stepping motor is rotated from a stop state, the control circuit executes an acceleration processing after sending pulses at a frequency not higher than a maximum self-start frequency.

8 Claims, 9 Drawing Sheets

FIG. 6

| No. | A-PHASE ||||||| B-PHASE ||||||| OUTPUT MODE ||||
|---|---|---|---|---|---|---|---|---|---|---|---|---|---|---|---|---|---|---|
| | IA4 | IA3 | IA2 | IA1 | ENA | PHA1 | Iout | IB4 | IB3 | IB2 | IB1 | ENA1 | PHA2 | Iout | OUTPUT A | OUTPUT A | OUTPUT B | OUTPUT B |
| 0 | 1 | 1 | 1 | 1 | 0 | 0 | 100% | 0 | 0 | 1 | 0 | 1 | 0 | 0% | L | H | L | H |
| 1 | 1 | 1 | 1 | 1 | 0 | 0 | 100 | 0 | 0 | 1 | 0 | 0 | 0 | 17.39 | L | H | L | H |
| 2 | 1 | 1 | 1 | 1 | 0 | 0 | 100 | 0 | 0 | 1 | 1 | 0 | 0 | 26.08 | L | H | L | H |
| 3 | 1 | 1 | 1 | 0 | 0 | 0 | 95.65 | 0 | 1 | 0 | 0 | 0 | 0 | 34.78 | L | H | L | H |
| 4 | 1 | 1 | 0 | 1 | 0 | 0 | 91.30 | 0 | 1 | 0 | 1 | 0 | 0 | 43.48 | L | H | L | H |
| 5 | 1 | 1 | 0 | 0 | 0 | 0 | 86.95 | 0 | 1 | 1 | 0 | 0 | 0 | 52.17 | L | H | L | H |
| 6 | 1 | 0 | 1 | 1 | 0 | 0 | 82.61 | 0 | 1 | 1 | 1 | 0 | 0 | 60.87 | L | H | L | H |
| 7 | 1 | 0 | 1 | 0 | 0 | 0 | 78.26 | 1 | 0 | 0 | 0 | 0 | 0 | 69.56 | L | H | L | H |
| 8 | 1 | 0 | 0 | 1 | 0 | 0 | 73.91 | 1 | 0 | 0 | 1 | 0 | 0 | 73.91 | L | H | L | H |
| 9 | 1 | 0 | 0 | 0 | 0 | 0 | 69.56 | 1 | 0 | 1 | 0 | 0 | 0 | 78.26 | L | H | L | H |
| 10 | 0 | 1 | 1 | 1 | 0 | 0 | 60.87 | 1 | 0 | 1 | 1 | 0 | 0 | 82.61 | L | H | L | H |
| 11 | 0 | 1 | 1 | 0 | 0 | 0 | 52.17 | 1 | 1 | 0 | 0 | 0 | 0 | 86.95 | L | H | L | H |
| 12 | 0 | 1 | 0 | 1 | 0 | 0 | 43.48 | 1 | 1 | 0 | 1 | 0 | 0 | 91.30 | L | H | L | H |
| 13 | 0 | 1 | 0 | 0 | 0 | 0 | 34.78 | 1 | 1 | 1 | 0 | 0 | 0 | 95.65 | L | H | L | H |
| 14 | 0 | 0 | 1 | 1 | 0 | 0 | 26.08 | 1 | 1 | 1 | 1 | 0 | 0 | 100 | L | H | L | H |
| 15 | 0 | 0 | 1 | 0 | 0 | 0 | 17.39 | 1 | 1 | 1 | 1 | 0 | 0 | 100 | L | H | L | H |
| 16 | 0 | 0 | 0 | 1 | 1 | * | 0 | 1 | 1 | 1 | 1 | 0 | 0 | 100 | H | L | L | H |
| 17 | 0 | 0 | 1 | 0 | 0 | 1 | 17.39 | 1 | 1 | 1 | 1 | 0 | 0 | 100 | H | L | L | H |
| 18 | 0 | 0 | 1 | 1 | 0 | 1 | 26.08 | 1 | 1 | 1 | 1 | 0 | 0 | 100 | H | L | L | H |
| 19 | 0 | 1 | 0 | 0 | 0 | 1 | 34.78 | 1 | 1 | 1 | 0 | 0 | 0 | 95.65 | H | L | L | H |
| 20 | 0 | 1 | 0 | 1 | 0 | 1 | 43.48 | 1 | 1 | 0 | 1 | 0 | 0 | 91.30 | H | L | L | H |
| 21 | 0 | 1 | 1 | 0 | 0 | 1 | 52.17 | 1 | 1 | 0 | 0 | 0 | 0 | 86.95 | H | L | L | H |
| 22 | 0 | 1 | 1 | 1 | 0 | 1 | 60.87 | 1 | 0 | 1 | 1 | 0 | 0 | 82.61 | H | L | L | H |
| 23 | 1 | 0 | 0 | 0 | 0 | 1 | 69.56 | 1 | 0 | 1 | 0 | 0 | 0 | 78.26 | H | L | L | H |
| 24 | 1 | 0 | 0 | 1 | 0 | 1 | 73.91 | 1 | 0 | 0 | 1 | 0 | 0 | 73.91 | H | L | L | H |
| 25 | 1 | 0 | 1 | 0 | 0 | 1 | 78.26 | 1 | 0 | 0 | 0 | 0 | 0 | 69.56 | H | L | L | H |
| 26 | 1 | 0 | 1 | 1 | 0 | 1 | 82.61 | 0 | 1 | 1 | 1 | 0 | 0 | 60.87 | H | L | L | H |
| 27 | 1 | 1 | 0 | 0 | 0 | 1 | 86.95 | 0 | 1 | 1 | 0 | 0 | 0 | 52.17 | H | L | L | H |
| 28 | 1 | 1 | 0 | 1 | 0 | 1 | 91.30 | 0 | 1 | 0 | 1 | 0 | 0 | 43.48 | H | L | L | H |
| 29 | 1 | 1 | 1 | 0 | 0 | 1 | 95.65 | 0 | 1 | 0 | 0 | 0 | 0 | 34.78 | H | L | L | H |
| 30 | 1 | 1 | 1 | 1 | 0 | 1 | 100 | 0 | 0 | 1 | 1 | 0 | 0 | 26.08 | H | L | L | H |
| 31 | 1 | 1 | 1 | 1 | 0 | 1 | 100 | 0 | 0 | 1 | 0 | 0 | 0 | 17.39 | H | L | L | H |

STEPPING MOTOR CONTROL APPARATUS, STEPPING MOTOR CONTROL METHOD, AND STEPPING MOTOR CONTROL PROGRAM PRODUCT

BACKGROUND OF THE INVENTION

1. Technical Field of the Invention

The present invention relates to a stepping motor control apparatus, a stepping motor control method, and a stepping motor control program product.

2. Description of the Related Art

A conventional stepping motor drive apparatus generally adopts a method in which reference is made to a table or the like which indicates a relation between a position of a rotator of a stepping motor and a phase, an exciting current corresponding to the position of the rotator is made to flow, and the rotator is rotated to a desired angle (see, JP-A-2002-281788 (Abstract, Claims)).

In the conventional drive apparatus, there is a problem that in the case where the relation between the position of the rotator and the phase deviates, an acceleration operation becomes unstable at the time of start of rotation, and there is a case where a discrepancy occurs between the phase of excitation and the position of the rotator, that is, the so-called loss of synchronism occurs.

In order to prevent the position of the rotator from deviating, a technique is proposed in which a hold current is made to flow at the time of stop of the stepping motor. However, in such a method, there is a problem that the motor generates heat by the hold current. Besides, since the hold current must be made to flow at all times, there is a problem that electric power consumption is increased.

SUMMARY OF THE INVENTION

The present invention has been made in view of the above circumstances, and has an object to provide a stepping motor control apparatus, a stepping motor control method, and a stepping motor control program product, in which a stepping motor is certainly started, and heat generation and electric power consumption are low.

In order to achieve the object, a stepping motor control apparatus according to an aspect of the invention includes a control circuit to control an excitation sequence of a stepping motor, and a switching circuit to switch electric power to be supplied to the stepping motor based on an instruction from the control circuit, and in a case where the stepping motor is rotated from a stop state, the control circuit executes an acceleration processing after a phase change is performed a specified number of times at a frequency not higher than a maximum self-start frequency.

Thus, the stepping motor control apparatus can be provided in which the stepping motor is certainly started, and the heat generation and electric power consumption are low.

Besides, according to a stepping motor control apparatus of another aspect of the invention, in addition to the foregoing invention, in the case where the stepping motor is rotated from the stop state, the control circuit causes the phase change to be performed to rotate the stepping motor at least once at the frequency not higher than the maximum self-start frequency. Thus, even in the case where the rotator of the stepping motor and the phase of the excitation are out of synchronization, the stepping motor can be certainly started.

Besides, according to a stepping motor control apparatus of another aspect of the invention, in addition to the foregoing invention, the control circuit can set, according to circumstances, the number of times of the phase change which is performed at the frequency not higher than the maximum self-start frequency. Thus, for example, even in the case where the state of the stepping motor is changed by the aged deterioration of the stepping motor or the like, the stepping motor can be certainly started.

Besides, according to a stepping motor control apparatus of another aspect of the invention, in addition to the foregoing invention, the control circuit sets the frequency of the phase change according to the maximum self-start frequency which is changed according to a load. Thus, even in the case where the load is changed, the stepping motor can be certainly started.

Besides, according to a stepping motor control apparatus of another aspect of the invention, in addition to the foregoing invention, in a case where the stepping motor is stopped, the switching circuit stops the supply of the electric power. Thus, a hold current as a current flowing in the case where the stepping motor is stopped is not made to flow, and therefore, the electric power consumption can be reduced.

Besides, according to a stepping motor control method of another aspect of the invention, in a case where a stepping motor is rotated from a stop state, after a phase change is performed a specified number of times at a frequency not higher than a maximum self-start frequency, an acceleration processing is performed.

Thus, the stepping motor control method can be provided in which the stepping motor is certainly started, and the heat generation and electric power consumption are low.

Besides, according to a stepping motor control program product of another aspect of the invention, in a case where a stepping motor is rotated from a stop state, after a phase change is performed a specified number of times at a frequency not higher than a maximum self-start frequency, an acceleration processing is performed.

Thus, the stepping motor control program product can be provided in which the stepping motor is certainly started, and the heat generation and electric power consumption are low.

BRIEF DESCRIPTION OF THE DRAWINGS

FIG. 6 is a view showing an example of a table which a drive circuit shown in FIG. 5 includes;

DETAILED DESCRIPTION OF THE INVENTION

Hereinafter, an embodiment of the invention will be described with reference to the drawings.

Figure 1:
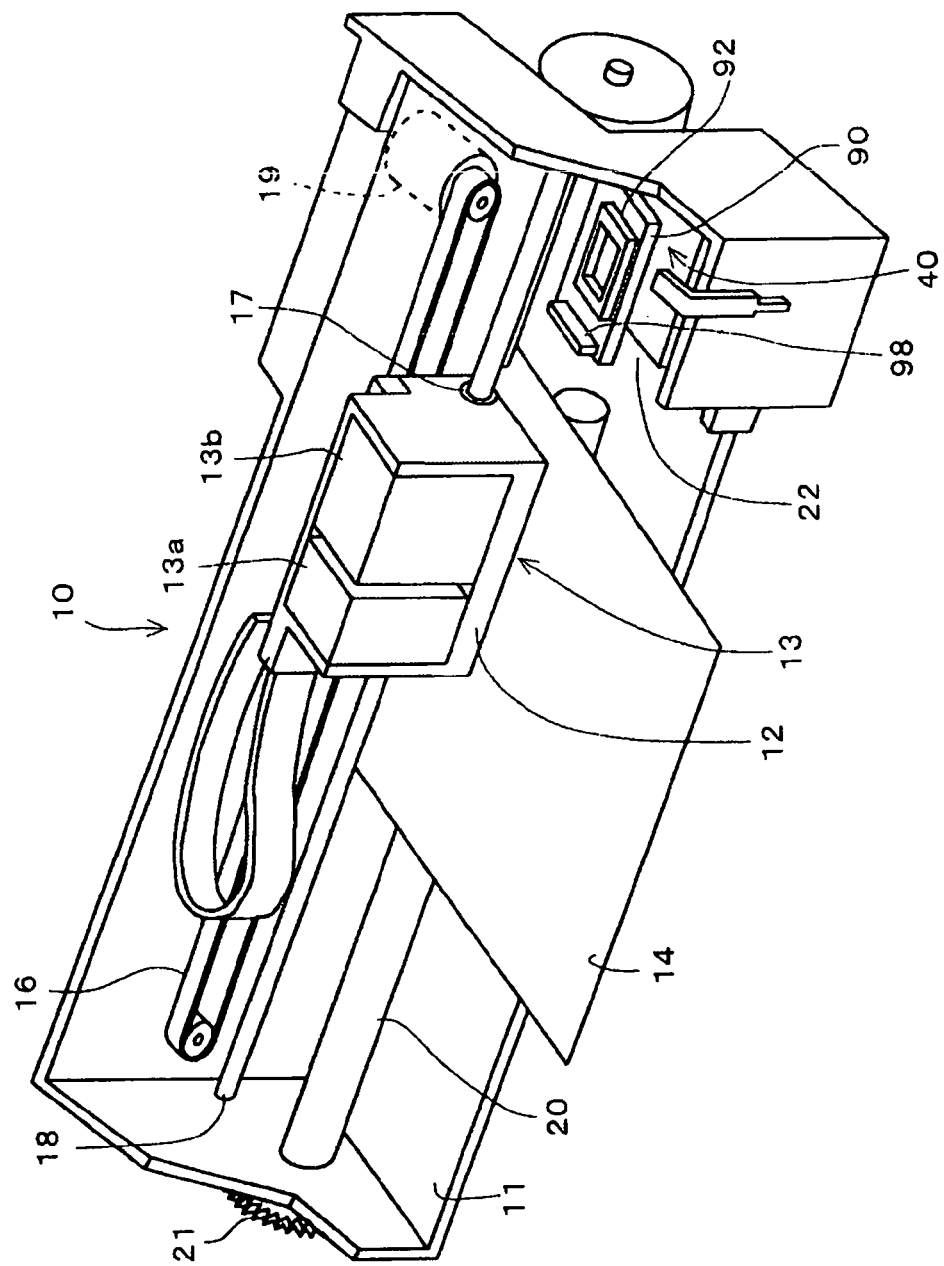
FIG. 1 is a view showing a structural example of a printing apparatus of an embodiment of the invention.

FIG. 1 is a view showing a structural example of a printing apparatus using a stepping motor control apparatus of an embodiment of the invention. Hereinafter, the embodiment of the invention will be described with reference to FIGS. 1 to 9. FIG. 1 is a perspective view showing the basic structure of a printing apparatus 10 of this embodiment. As shown in FIG. 1, the printing apparatus 10 includes a base 11, and a carriage 12 is constructed to freely reciprocate with respect to the base 11.

The carriage 12 constitutes an ink-jet recording head body 13, and can mount therein a cartridge 13a for black ink and a cartridge 13b for yellow, cyan and magenta. A recording head 15 is provided below the carriage 12 so as to be opposed to a recording sheet 14. A lower end face of the recording head 15 is a nozzle formation face 15a, and can discharge ink.

A part of a timing belt 16 is fixed to this carriage 12. An insertion hole 17 is formed in the carriage 12, and a long guide shaft 18 can be inserted through this insertion hole 17. Thus, when a carriage motor 19 is rotated, the timing belt 16 is driven, and the carriage 12 is moved along the guide shaft 18 by the driving of this timing belt 16.

A roller member 20 is rotatably provided on a lower side of the inside of the base 11. The roller member 20 is provided to be rotatable by a gear train 21 existing on the other end side of the base 11. The recording sheet 14 supplied to the printing apparatus 10 is moved in the sub-scanning direction of the recording head 15 by the rotation of the roller member 20. In order to rotation-drive the roller member 20, a not-shown paper feed motor is provided on the other end side of the inside of the base 11.

Here, the roller member 20 is provided only in a region (printing region) where printing is performed to the maximum in the inside of the base 11. A non-printing region where the roller member 20 is not provided in the inside of the base 11 is a home position where an after-mentioned cap unit 40 is provided.

Figure 2:
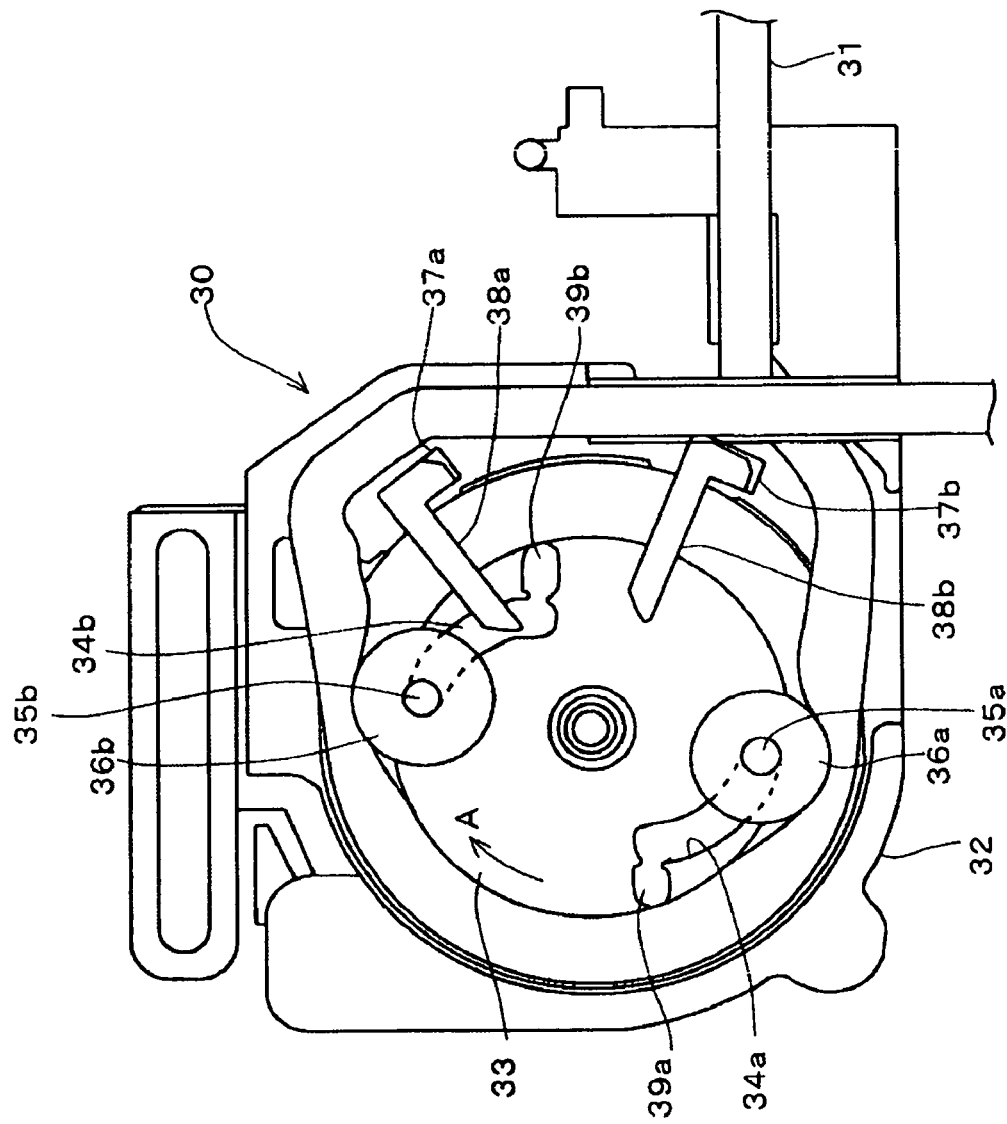
FIG. 2 is a view showing a detailed structural example of a tube pump shown in FIG. 1.
Figure 3:
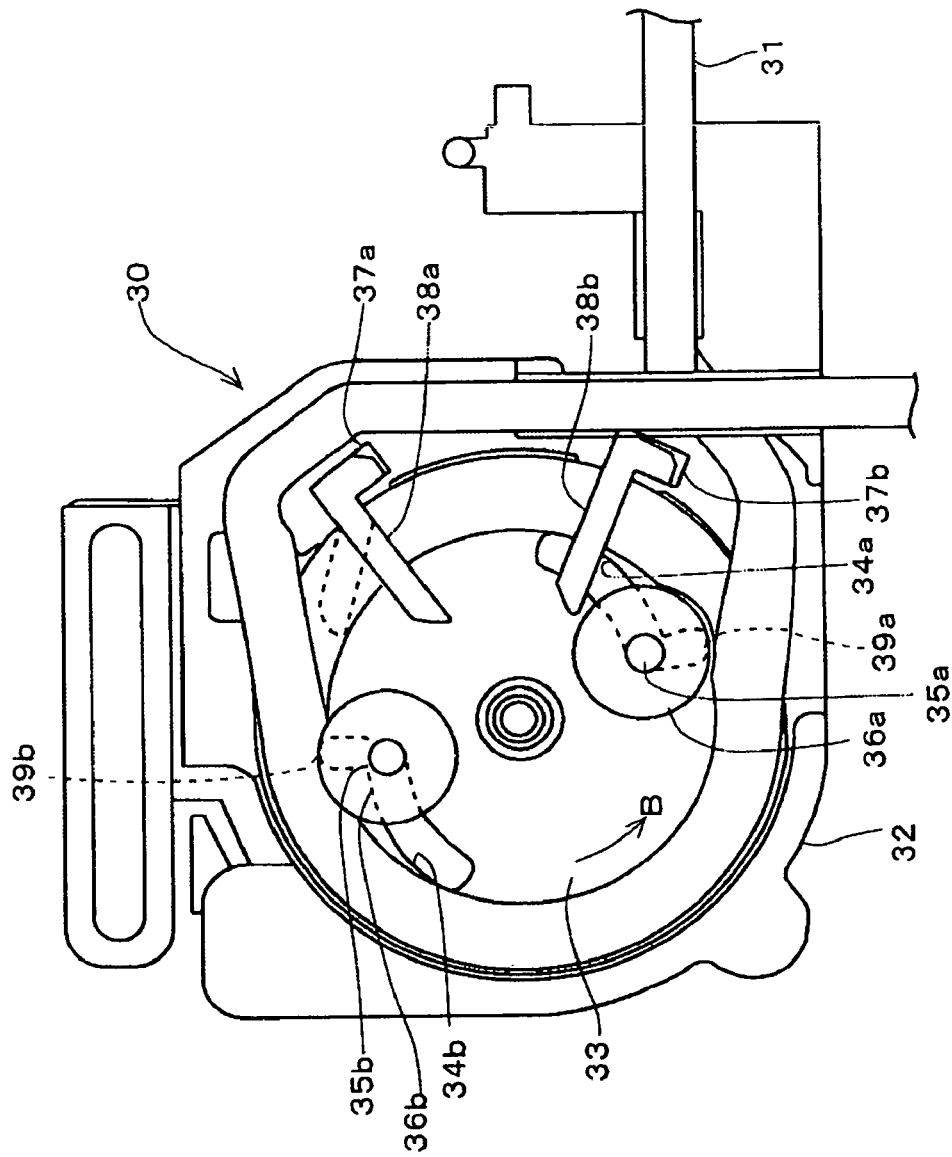
FIG. 3 is a view showing a detailed structural example of the tube pump shown in FIG. 1.

On the bottom side of the base 11 in the home position 22, a tube pump 30 as a suction pump as shown in FIG. 2 and FIG. 3 is provided. The tube pump 30 includes a pump frame 32 whose plane shape is an arc, and a flexible tube 31 is disposed along the inside surface of the pump frame 32. Its one end (right end in the drawing) is connected to a not-shown connection pipe of a cap head 90, and the other end (lower end of the drawing) is connected to a not-shown waste liquid tank.

Roller support grooves 34a and 34b are provided in a pump wheel 33 of the tube pump 30. Roller support shafts 35a and 35b are inserted therein, and hold support rollers 36a and 36b rotatably and movably. Insertion openings 39a and 39b are provided at ends of the roller support grooves 34a and 34b, and the roller support shafts 35a 35b are inserted from the portions at the time of assembly. Engagement grooves 37a and 37b each recessed in a substantially L shape are formed in part of the pump frame 32, and guide members 38a and 38b formed of elastic member are fitted therein. The tube pump 30 as stated above performs a suction operation when the pump wheel 33 is driven by an after-mentioned stepping motor 121.

As shown in FIG. 2, when the pump wheel 33 is driven in the clockwise direction (direction of an arrow A), since the guide members 38a and 38b press the rollers 36a and 36b in the counterclockwise direction, the rollers 36a and 36b moves to the ends opposite to the insertion openings 39a and 39b of the roller support grooves 34a and 34b. Here, since the diameters of the roller support grooves 34a and 34b become large toward the direction opposite to the insertion openings 39a and 39b, the rollers 36a and 36b move toward the outside. As a result, since the rollers 36a and 36b rotate while pressing the flexible tube 31 toward the outside, the liquid and gas in the inside of the flexible tube 31 are moved in the direction of the arrow A. As a result, the ink is moved from the cap head 90 to the waste liquid tank.

As shown in FIG. 3, when the pump wheel 33 is driven in the counterclockwise direction (direction of an arrow B), since the guide members 38a and 38b press the rollers 36a 36b in the clockwise direction, the rollers 36a and 36b move toward the insertion openings 39a and 39b of the roller support grooves 34a and 34b. As a result, the rollers 36a and 36b move toward the inside, and there occurs a state where the rollers 36a and 36b are in slight contact with the flexible tube 31. Thus, by keeping this state, it is possible to prevent the inner walls of the flexible tube 31 from adhering to each other.

Figure 4:
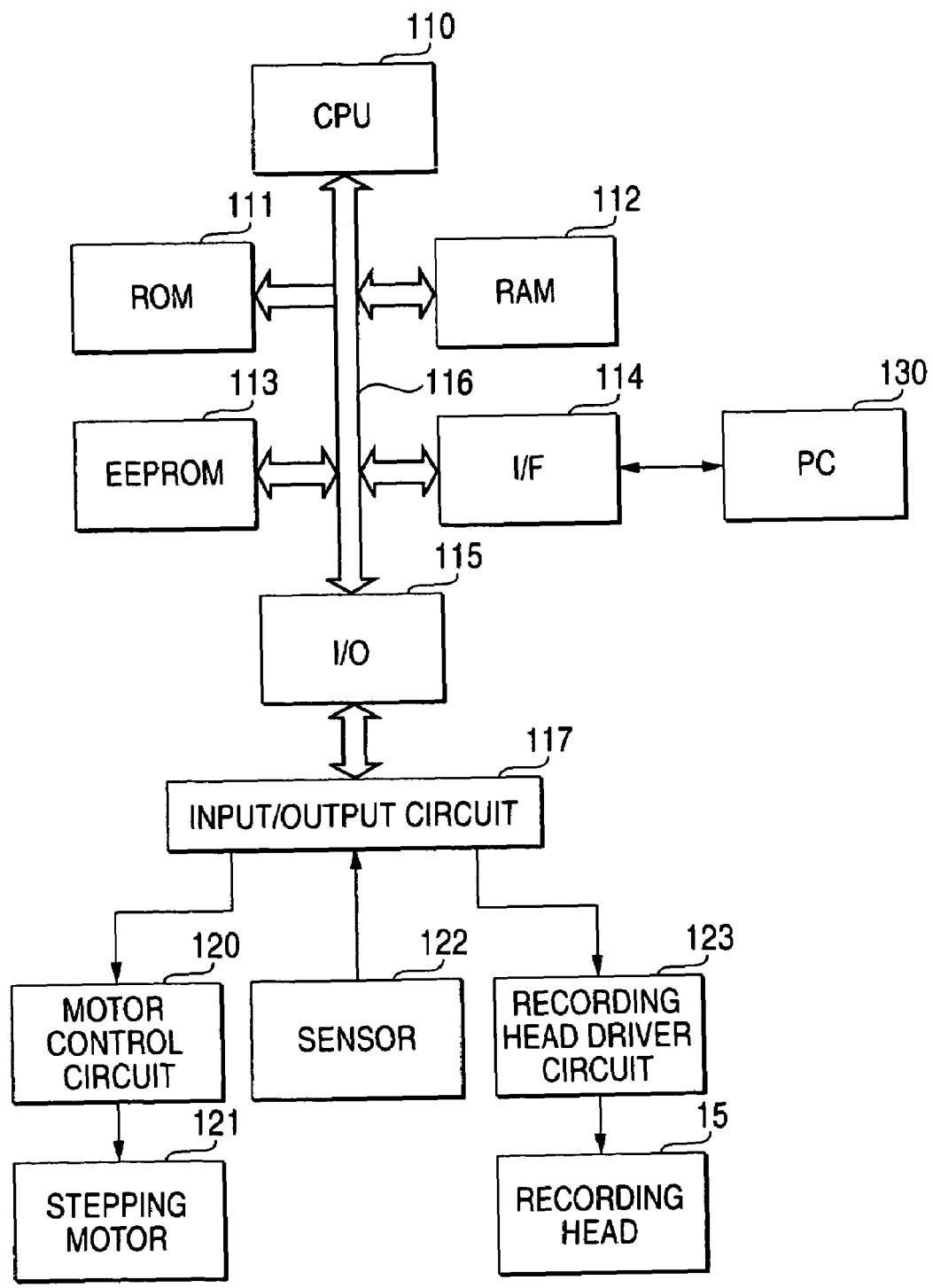
FIG. 4 is a view showing a structural example of a control system shown in FIG. 1.

Next, a control system of the printing apparatus shown in FIG. 1 will be described. FIG. 4 is a block diagram showing the control system of the printing apparatus shown in FIG. 1. As shown in this drawing, the control system of the printing apparatus includes a CPU (Central Processing Unit) 110, a ROM (Read Only Memory) 111, a RAM (Random Access Memory) 112, an EEPROM (Electrically Erasable and Programmable ROM) 113, an I/F (Interface) 114, an I/O (Input and Output) 115, a bus 116, an input/output circuit 117, a motor control circuit 120, a stepping motor 121, a sensor 122, a recording head driver circuit 123, and a recording head 115. A personal computer (PC) is connected to the I/F 114.

Here, the CPU 110 performs various arithmetic processings according to programs stored in the ROM 111 and the EEPROM 113, and controls the respective parts of the apparatus including the stepping motor 121.

The ROM 111 is a semiconductor memory storing various programs and various data to be executed by the CPU 110.

The RAM 112 is a semiconductor memory to temporarily store programs and data which become execution objects of the CPU 110.

The EEPROM 113 is a semiconductor memory in which specified data of results of the arithmetic processing of the CPU 110 are stored and the data is held even after the power supply of the printing apparatus is cut off.

The I/F 114 is a device to suitably transform a representation format of data when information is given to and received from the personal computer 130.

The bus 116 is a signal line group to mutually connect the CPU 110, the ROM 111, the RAM 112, the EEPROM 113, the I/F 114 and the I/o 115 and to enable information to be given and received among them.

The motor control circuit 120 includes a logic circuit and a drive circuit as described later, and controls the stepping motor 121 according to the control of the CPU 110.

The stepping motor 121 is constructed of, for example, a two-phase stepping motor, and drives the tube pump 30 shown in FIG. 2 according to the control of the motor control circuit 120.

Incidentally, in the example shown in FIG. 4, although only the stepping motor 121 to drive the tube pump 30 is shown, actually, a not-shown stepping motor to drive the roller member 20, and a stepping motor (carriage motor 19) to drive the carriage 12 in the main scanning direction are also controlled by a control circuit similar to the motor control circuit 120.

The sensor 122 includes, for example, a recording sheet sensor, an ink remaining amount sensor, an accumulated working time sensor and the like, detects various states of the printing apparatus, and outputs them to the I/O 115 through the input/output circuit 117.

The recording head driver circuit 123 is connected to the recording head 15 to perform a recording processing to the recording sheet 14, and is a driver to perform the control of the recording processing to the recording head 15. As described before, the recording head 15 discharges inks of various colors from plural nozzles according to the control of the recording head driver circuit 123, and prints desired images and characters on the recording sheet 14.

Figure 5:
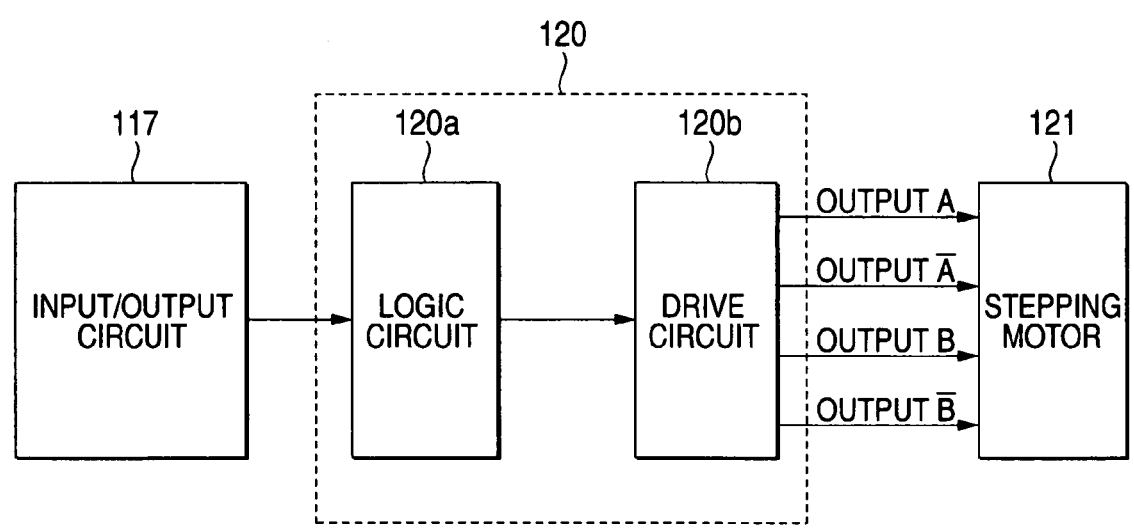
FIG. 5 is a view showing a detailed structural example of a motor control circuit shown in FIG. 4.

FIG. 5 is a view showing a detailed structural example of the motor control circuit 120. As shown in this drawing, the motor control circuit 120 includes, as main structural elements, a logic circuit 120a and a drive circuit 120b.

Here, the logic circuit 120a as the control circuit inputs setting data from the CPU 110 through the input/output circuit 117, and performs the setting of an operation environment, and further controls the drive circuit 120b according to drive data supplied from the CPU 110. The drive circuit 120b as a switching circuit switches electric power from a not-shown power source based on the control of the logic circuit 120a, and causes an exciting current to flow to the stepping motor 121 to drive it.

FIG. 6 shows control data to be inputted to the logic circuit 120a from the CPU 110, and output states of the drive circuit 120b corresponding thereto. The stepping motor 121 is a two-phase stepping motor having two windings of an A-phase and a B-phase. In FIG. 6, IA1 to IA4 specify a current output ratio Iout of chopping current to be outputted to the A-phase. Accordingly, by continuously changing the data of IA1 to IA4, the current output ratio Iout of the chopping current to be outputted to the A-phase can be continuously raised or lowered.

ENA1 and ENA2 denote signals to specify that the output is turned on or off. PHA1 specifies an output mode to select to which of output terminals A and A- (A bar) the chopping current is outputted. In this embodiment, when PHA1 is specified to 0, the output mode of the output terminal A becomes L (low), and when specified to 1, the output mode of the output terminal A- becomes L, and the chopping current is outputted from the output terminal whose output mode is L. Similarly to IA1 to IA4 of the A-phase, IB1 to IB4 of the B-phase specify a current output ratio Iout of chopping current to be outputted to the B-phase. Similarly to PHA1 of the A-phase, PHA2 specifies the output mode of the B-phase. In the drawing, * denotes that either of 0 and 1 may be adopted.

Although not shown in this drawing, there are data DE1 and DE2 for setting a decay. The data DE1 specifies the decay setting of the chopping current to be outputted to the A-phase, and the data DE2 specifies the decay setting of the chopping current to be outputted to the B-phase. Here, the decay indicates a current regenerative method at the chopping off time. A slow decay indicates a method in which a switching transistor is held in an on state, and the current is regenerated through the transistor. A fast decay is a method in which the transistor is turned off, and the current is regenerated through a diode for regeneration. The latter has better responsiveness than the former, and can perform rapid acceleration/deceleration, however, there is a feature that the loss of the stepping motor becomes large since there are many ripples. A mixed decay in which they are combined may be made selectable. In this embodiment, when 0 is specified, the fast decay is selected, and when 1 is specified, the slow decay is selected.

The stepping motor 121 is excited by the current values of the current output ratios Iout which are different between the two phases of the A-phase and the B-phase. The current output ratios Iout of the chopping currents to be outputted to the A-phase and the B-phase are selected from states No. 0 to No. 31 according to the excitation system (for example, 1-2 phase, W1-2 phase, etc.) and are raised or lowered, and the current balance of the two phases of the A-phase and B-phase is changed, so that the stepping motor 121 is rotated.

Next, the operation of the embodiment will be described.

Figure 7:
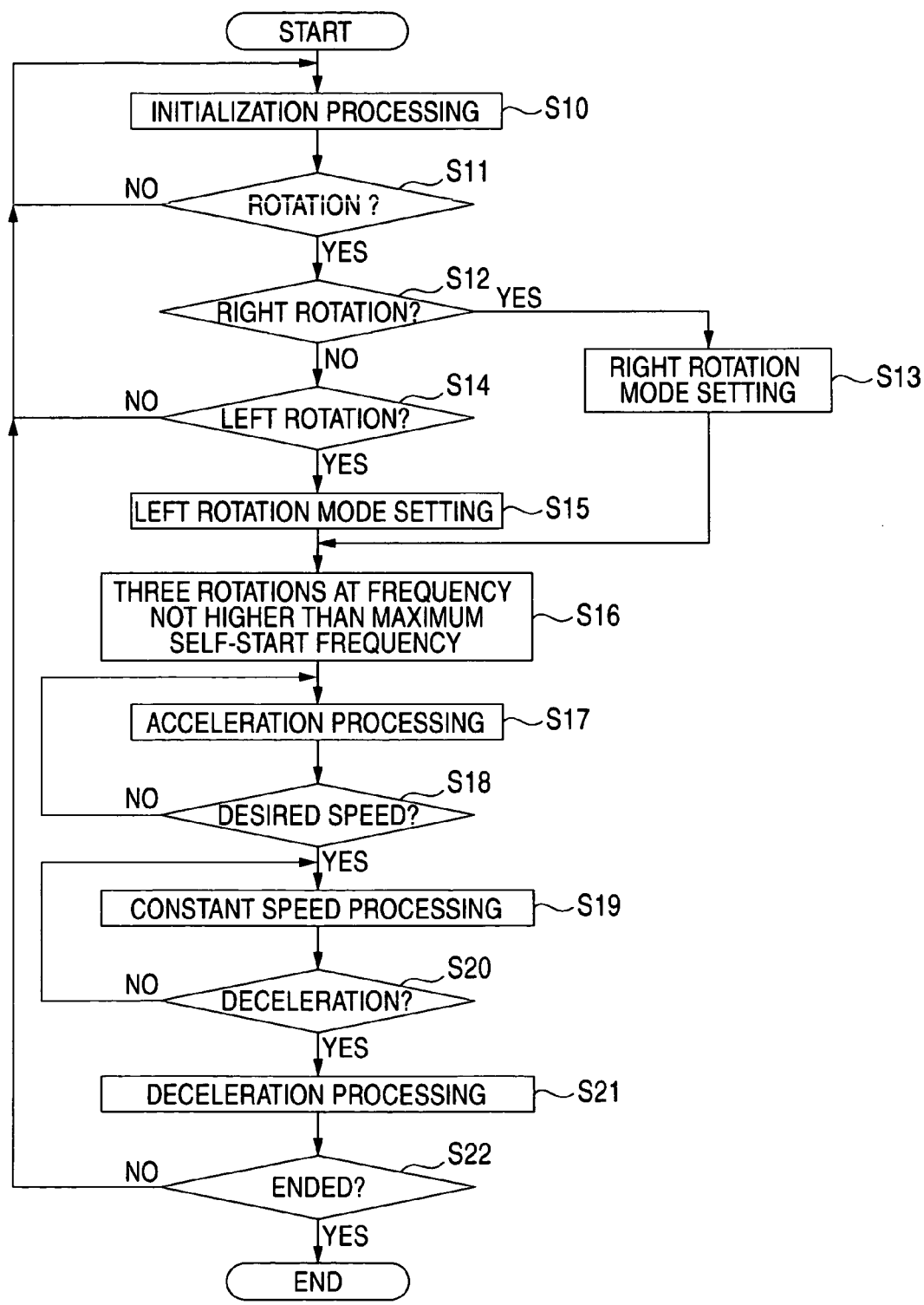
FIG. 7 is view showing an example of a flowchart executed by a CPU.

FIG. 7 is a flowchart for explaining the operation of the embodiment of the invention. This processing is realized by executing a program stored in the ROM 11. When the processing of this flowchart is started, following steps are executed.

Step S10: The CPU 110 executes an initialization processing. That is, the CPU 110 sends the setting data to the motor control circuit 120, and the motor control circuit 120 receives the setting data from the CPU 110 and performs the initialization processing. Specifically, the CPU 110 performs the setting of the forgoing decay mode and the like.

Step S11: The CPU 110 judges whether or not there occurs a necessity to rotate the stepping motor 121, and in the case where there occurs the necessity to rotate, advance is made to step S12, and in the other case, the same processing is repeated. For example, in the case where there occurs a necessity to suck ink by driving the tube pump 30, advance is made to step S12. In this embodiment, in the case where the stepping motor 121 is at a stop, the hold current to hold the rotator at a specified angle is not made to flow. Thus, the electric power consumption necessary to cause the hold current to flow can be reduced.

Step S12: The CPU 110 judges whether or not the stepping motor 121 should be rotated rightward, and in the case of the right rotation, advance is made to step S13, and in the other case, advance is made to step S14.

Step S13: The CPU 110 sets the stepping motor 121 in a mode of right rotation. As a result, specified data is read from the states No. 0 to No. 31 shown in the sequence view of FIG. 6 in, for example, ascending order and is outputted.

Step S14: The CPU 110 judges whether or not the stepping motor 121 should be rotated leftward, and in the case of the left rotation, advance is made to step S15, and in the other case, judgment of an error is made and return is made to step S11.

Stop S15: The CPU 110 sets a mode in which the stepping motor 121 is rotated leftward. As a result, specified data is read from the states No. 0 to No. 31 shown in the sequence view shown in FIG. 6 in, for example, descending order and is outputted.

Step S16: The CPU 110 sends the control data to the motor control circuit 120, and rotates the stepping motor 121, for example, three times at a frequency not higher than the maximum self-start frequency. Specifically, the CPU 110 reads the data corresponding to the set rotation mode from the sequence view shown in FIG. 6, and supplies it to the motor control circuit 120 while adjusting the output timing to make the frequency not higher than the maximum self-start frequency. A method of adjusting the output timing may be such that for example, each time data is outputted, reference is made to a not-shown timer to execute a wait cycle, and after a specified time has passed, next data is outputted. Then, the control signal to rotate the stepping motor 121, for example, three times is continuously supplied. Here, the maximum self-start frequency is a maximum pulse speed (pps: pulses per second) at which the stepping motor 121 in a stop state can be activated.

At this time, the stepping motor 121 is in the stop state, and as described later, in the embodiment of the invention, since the hold current to hold the rotator at a specified angle is not made to flow, it is unclear at what angle the rotator stops. However, by performing the excitation to perform three rotations at the pulse speed not higher than the maximum self-start frequency, even in the case where the rotator is stopped at any angle, this is sucked and is forcibly rotated, and therefore, there occurs a state where the excitation state and the angle of the rotator coincide with each other. Theoretically, when at least one rotation is performed, there occurs a state where the excitation state and the angle of the rotator coincide with each other. However, in this embodiment, the three rotations are performed in order to certainly perform the starting. In the case where it is necessary to perform the starting at high speed, one or two rotations, or the number of times of rotation other than that (for example, 1.5 rotations) may be performed.

Step S17: the CPU 110 starts an acceleration processing. That is, the CPU 110 increases the pulse speed of the control data supplied to the motor control circuit 120, and accelerates the stepping motor 121. As a method of the acceleration, the pulse speed is increased according to, for example, a constant acceleration approximation curve, a SIN function approximation curve, or an exponential function approximation curve.

Step S18: The CPU 110 judges whether or not the rotation speed of the rotator of the stepping motor 121 has reached a desired speed, and in the case of reached it, advance is made to step S19, and in the other case, return is made to step S17, and the same processing is repeated.

Step S19: The CPU 110 executes a constant speed processing to rotate the stepping motor 121 at a constant speed. That is, the CPU 110 repeats an operation to send a control signal to the motor control circuit 120 to make a pulse speed constant.

Step S20: The CPU 110 judges whether or not the stepping motor 121 should be decelerated. In the case of the deceleration, advance is made to step S21, and in the other case, return is made to step S19, and the same processing is repeated.

Step S21: The CPU 110 starts a deceleration processing. That is, the CPU 110 decreases the pulse speed of the control data supplied to the motor control circuit 120, and decelerates the stepping motor 121. As a method of the deceleration, for example, the pulse speed is decreased according to, for example, the foregoing constant acceleration approximation curve, the SIN function approximation curve, or the exponential function approximation curve, or the pulse speed is decreased at such a speed that a sound generated from the stepping motor 121 is not obtrusive. In this embodiment, after the stepping motor 121 is stopped, as stated above, the hold current to hold the rotator at a specific angle is not made to flow.

Step S22: The CPU 110 judges whether or not the processing is ended, that is, it is necessary to again rotate the stepping motor 121, and in the case where it is judged that there is no need to rotate, the processing is ended, and in the other case, return is made to step S11, and the same processing is repeated.

Figure 8:
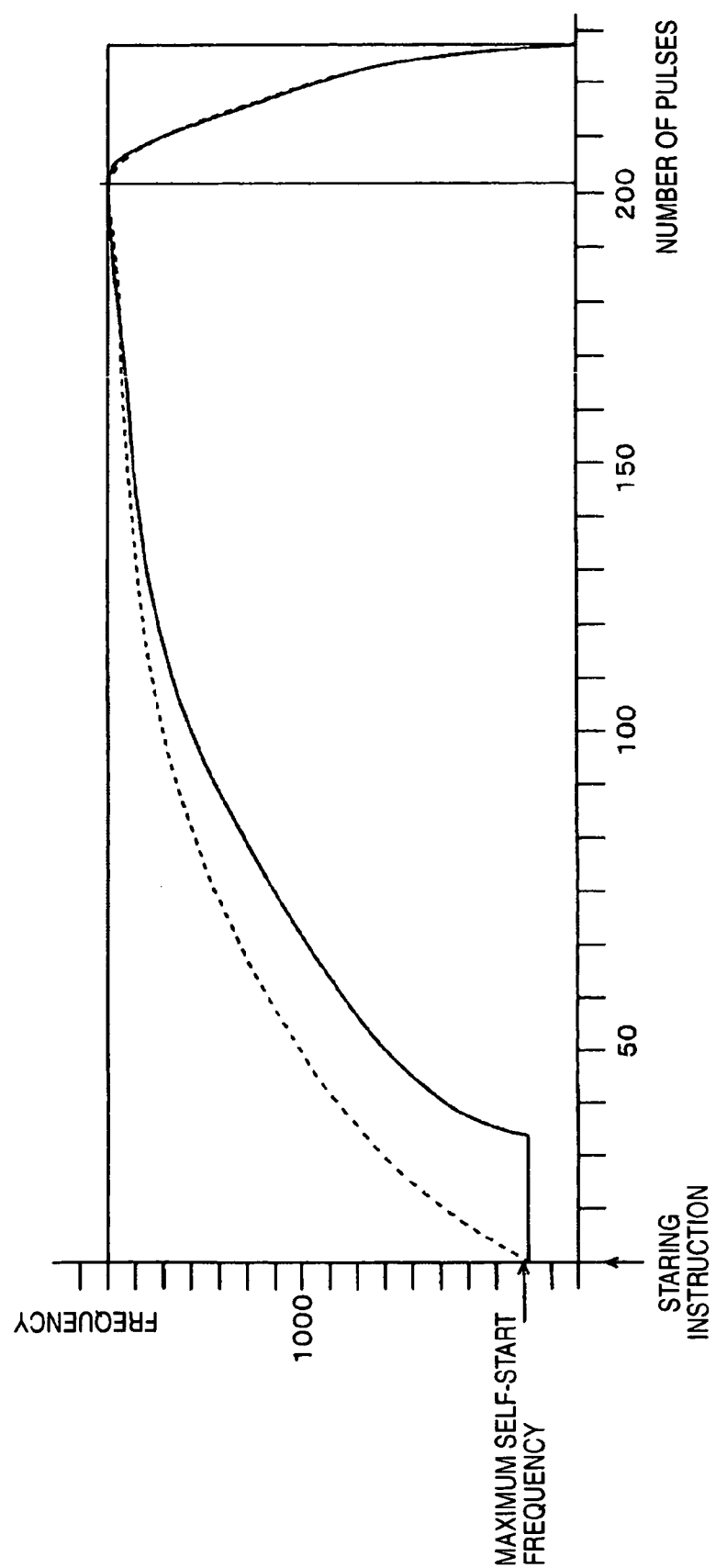
FIG. 8 is a view showing starting states of motors according to the embodiment and the related art.

FIG. 8 is view showing the state of the starting and stop of the stepping motor 121 by the processing shown in FIG. 7. In this drawing, the horizontal axis indicates the accumulated number of pulses supplied to the motor control circuit 120, and the vertical axis indicates the pulse speed. A broken line indicates the starting and stop by the conventional method, and a solid line indicates the starting and stop by the embodiment of the invention. As shown in this drawing, in the conventional method, the acceleration processing is executed immediately after the starting instruction is given. On the other hand, in the embodiment of the invention, the acceleration processing is started after constant speed driving is performed a specified number of times at a frequency not higher than the maximum self-start frequency.

In the conventional method, since the state in which the frequency is not higher than the maximum self-start frequency continues merely for a very short time immediately after the starting instruction is given, in the case where a discrepancy occurs between the angle of the rotator and the phase of excitation due to the change of a load applied to the stepping motor or the like, the starting can not be performed, and in the worst case, the loss of synchronism occurs, and the stepping motor is stopped. On the other hand, in the embodiment of the invention, since at least one rotation is performed at a frequency not higher than the maximum self-start frequency, even if the angle of the rotator and the phase of the excitation are out of synchronization, the rotator is sucked and the starting can be certainly performed.

In the conventional method, for the purpose of preventing that a discrepancy occurs between the angle of the rotator and the phase of the excitation, and the starting becomes difficult, the hold current is made to flow in the case where the rotator is at a stop. However, in such a method, in the case where the rotator is at a stop, the hold current is required to be always made to flow, and therefore, the electric power consumption is increased. In the case where the load fluctuates, it is necessary to increase the hold current to a certain degree in order to cope with the fluctuation of the load. However, when the hold current is increased, the heat generation of the stepping motor is increased. On the other hand, in the embodiment of the invention, even in the case where a discrepancy occurs between the angle of the rotator and the phase of the excitation, the stepping motor can be certainly started, and therefore, the hold current is not required to be made to flow. Thus, the electric power consumption is reduced, and the heat generation of the stepping motor can be decreased.

Incidentally, the above embodiment is one example, and there are various modified examples other than that. For example, in the above embodiment, when the stepping motor 121 is started, three rotations are performed at the frequency not higher than the maximum self-start frequency. However, for example, one or two rotations, or four or more rotations may be performed. In the case where the discrepancy between the angle of the rotator and the phase of the excitation is small, one or less rotation (for example, ½ rotation) may be set.

Besides, in the above embodiment, although the rotation is performed at the frequency not higher than the maximum self-start frequency in the same direction as the direction of starting, after the excitation is performed to perform, for example, ¼ rotation in the direction opposite to the direction of starting, the excitation may be performed in the direction of starting. According to the embodiment as stated above, even in the case where the rotator is deviated in any direction, it becomes possible to certainly perform the starting in a short time.

Besides, in the above embodiment, although the number of times of rotation is fixed (for example, three), the number of times may be changed according to, for example, the state of the apparatus. For example, in the case of the tube pump, since the viscosity of ink is changed according to the temperature, the environmental temperature is detected by, for example, a temperature sensor or the like, and in the case where the temperature is high, since the viscosity is low, the number of times may be automatically decreased, and in the case where the temperature is low, since the viscosity is high, the number of times may be automatically increased. Besides, in view of deterioration of respective parts of the printing apparatus due to the aging, as the elapsed time from the manufacture (or from the start of use) becomes long, the number of times of rotation may be increased.

Figure 9:
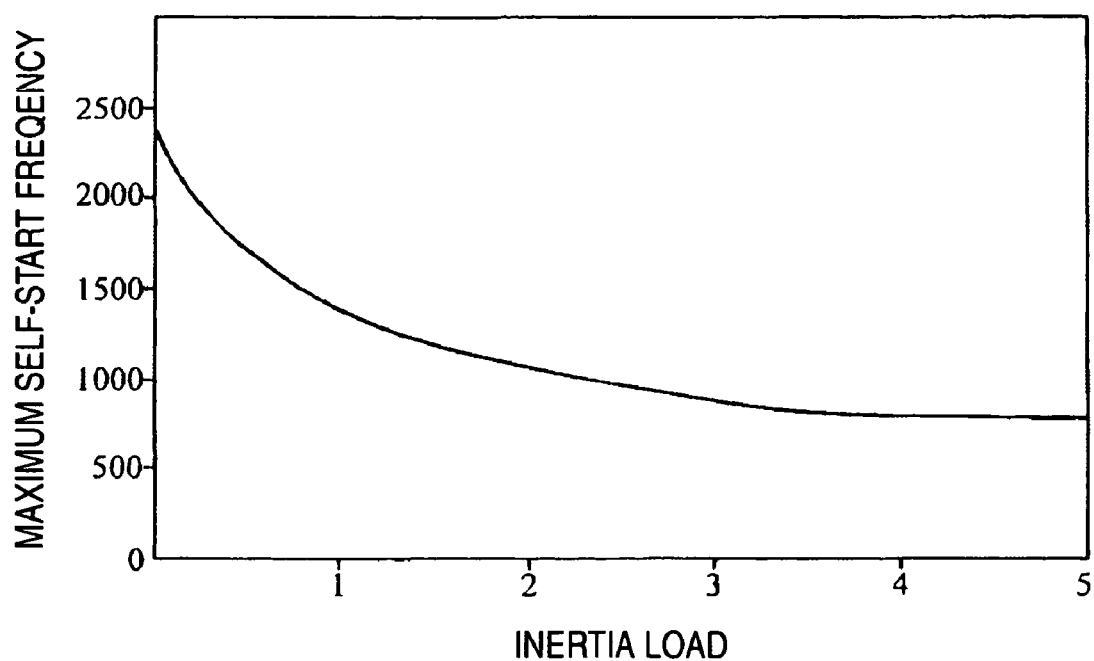
FIG. 9 is a view showing a relation between an inertia load and a maximum self-start frequency.

Besides, in the above embodiment, although the maximum self-start frequency is assumed to be constant, actually, it is known to be changed by an inertia load. FIG. 9 is a view showing the relation between the inertia load and the maximum self-start frequency. As shown in this drawing, when the inertia load is increased, the maximum self-start frequency is decreased according to that Accordingly, in the case where the inertia load is changed, for example, the maximum inertia load is actually measured, the maximum self-start frequency is obtained according to the measurement result, and setting may be made to a frequency not higher than the obtained maximum self-start frequency.

In the case where the maximum self-start frequency is not actually measured, the maximum self-start frequency can be approximately obtained by, for example, a following method. That is, in the case where the maximum self-start frequency of only the stepping motor is made fs, the maximum self-start frequency in the case where there is an inertia load is made f, the inertia moment of the rotator is made Jo, and the inertia moment of the load is made $J_L$, the following expression is established among these.

$$f = fs/(1 + J_L/Jo)^{1/2} \quad \text{(expression 1)}$$

Accordingly, in the case where fs, $J_L$ Jo are obtained, since the maximum self-start frequency f can be approximately obtained by using the above expression, setting may be made using the value.

In the case where the maximum self-start frequency is changed according to the state of the stepping motor 121, the maximum self-start frequency may be changed according to the respective states. For example, in the case where the tube pump 30 is made the load, and for example, when the maximum self-start frequency is different between the right rotation and the left rotation, the maximum self-start frequency may be changed according to the respective directions. In the case where the maximum self-start frequency is changed according to the stop position of the stepping motor 121, the immediately preceding stop position is memorized, and the pulse speed may be determined according to the maximum self-start frequency at the position.

Besides, in the above embodiment, although the two-phase stepping motor 121 is used, it is also possible to use one-phase or three or more-phase stepping motor.

Besides, in the above embodiment, in the case where the stepping motor 121 is rotated at the maximum self-start frequency or lower (in the case where starting is performed), the same current as that at the time of acceleration is made to flow. However, the exciting current may be increased only in the case of the starting. According to the embodiment as stated above, the stepping motor 121 can be certainly started.

Besides, in the above embodiment, although the stepping motor 121 can be rotated in both of the right and left directions, it is needless to say that the invention can be applied also to the case where the stepping motor is rotated only in one direction.

Besides, in the above embodiment, the CPU 110 generates the control signal, and the logic circuit 120a receives this and drives the drive circuit 120b. However, the division of roles is not limited to the case as stated above. For example, the logic circuit 120a can be substituted for the function of the CPU 110.

Besides, the sequence view shown in FIG. 6 is an example, and the invention is not limited to the case as stated above.

Besides, in the above embodiment, as shown in FIG. 8, in the case where the stepping motor 121 is stopped, the deceleration processing is executed. However, in this embodiment, in the case where the stepping motor 121 is stopped, even if the angle of the rotator and the phase of the excitation do not coincide with each other, the starting can be certainly performed. Thus, it becomes possible to rapidly stop the rotation without performing the deceleration processing. For example, it becomes possible to stop the excitation or to perform the excitation in the reverse direction to the rotation direction of the rotator. In the embodiment as stated above, the rotator can be rapidly stopped.

The above processing functions can be realized by a computer. In that case, there is provided a program describing the processing contents of the functions which the stepping motor drive apparatus should have. The computer executed the program, so that the processing functions are realized on the computer. The program describing the processing contents can be recorded on a computer readable recording medium. The computer readable recordable medium includes a magnetic recording device, an optical disk, a magneto-optical recording medium, a semiconductor memory or the like. The magnetic recording device includes a hard disk drive (HDD), a flexible disk (FD), a magnetic tape or the like. The optical disk includes a DVD (Digital Versatile Disk), a DVD-RAM, a CD-ROM (Compact Disk ROM), a CD-R (Recordable)/RW (ReWritable) or the like. The magneto-optical recording medium includes an MO (Magneto-Optical disk) or the like.

In the case where the program is circulated, for example, a portable recording medium, such as a DVD or a CD-ROM, in which the program is recorded is sold. Besides, the program is stored in a storage device of a server computer, and the program can also be transferred through a network from the server computer to another computer.

The computer to execute the program stores, for example, the program recorded on the portable recording medium or the program transferred from the server computer into its own storage device. Then, the computer reads the program from its own storage device, and executes the processing in accordance with the program. Incidentally, the computer directly reads the program from the portable recording medium, and can also execute the processing in accordance with the program. Besides, each time the program is transferred from the server computer, the computer can also sequentially execute the processing in accordance with the received program

What is claimed is:

1. A stepping motor control apparatus comprising:
    a control circuit, that controls an excitation sequence of a stepping motor; and
    a switching circuit, that switches electric power to be supplied to the stepping motor based on an instruction from the control circuit,
    wherein when the stepping motor is rotated from a stop state, the control circuit executes an acceleration processing after a phase change is performed a specified number of times at a frequency not higher than a maximum self-start frequency, wherein the acceleration processing is executed after constant speed driving is performed the specified number of times at the frequency not higher than the maximum self-start frequency.

2. A stepping motor control method for rotating a stepping motor from a stop state, comprising:

performing a phase change with a constant speed a specified number of times at a frequency not higher than a maximum self-start frequency; and then performing an acceleration processing.

3. The stepping motor control method according to claim 2, wherein the frequency not higher than a maximum self-start frequency is a frequency lower than the maximum self-start frequency.

4. The stepping motor control method according to claim 2, wherein the specified number of times is at least once.

5. The stepping motor control method according to claim 2, wherein the specified number of times is changed according to circumstances.

6. The stepping motor control method according to claim 2, wherein the frequency not higher than a maximum self-start frequency is set according to the maximum self-start frequency which is changed according to a load.

7. The stepping motor control method according to claim 2, further comprising:

stopping supply of the electric power when the stepping motor is stopped.

8. A stepping motor control program product including a set of instructions for rotating a stepping motor from a stop state, the set of instructions comprising:

performing a phase change with a constant speed a specified number of times at a frequency not higher than a maximum self-start frequency; and then performing an acceleration processing.

* * * * *